Aug. 9, 1966 — T. A. LAVENGOOD — 3,265,166

BRAKE SHOE

Filed Aug. 31, 1964 — 4 Sheets-Sheet 1

INVENTOR.
THOMAS H. LAVENGOOD
BY
Sheldon F. Raizes
ATTORNEY

INVENTOR.
THOMAS H. LAVENGOOD
BY
Sheldon F. Raizes
ATTORNEY

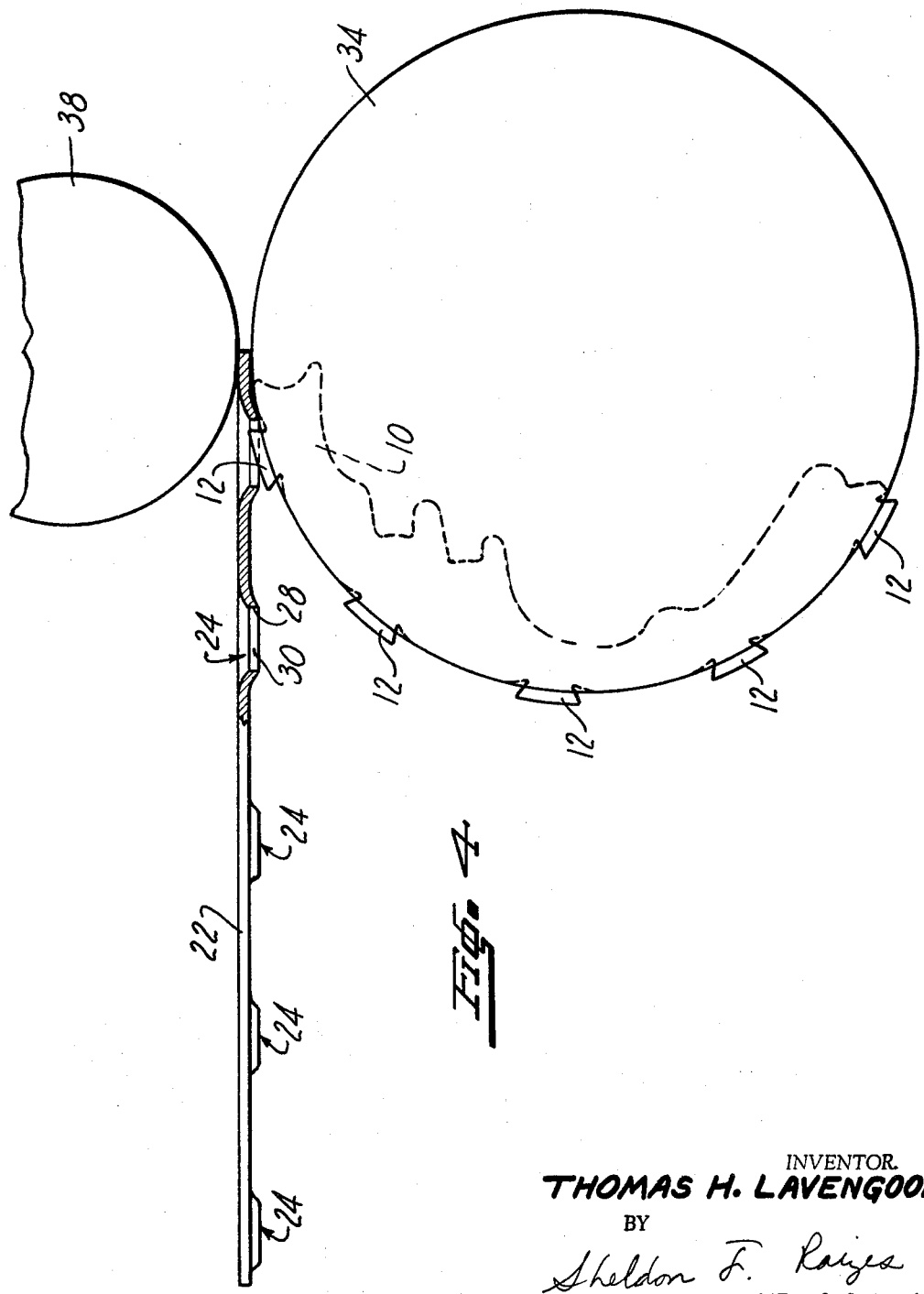

Aug. 9, 1966     T. A. LAVENGOOD     3,265,166
BRAKE SHOE
Filed Aug. 31, 1964     4 Sheets-Sheet 4
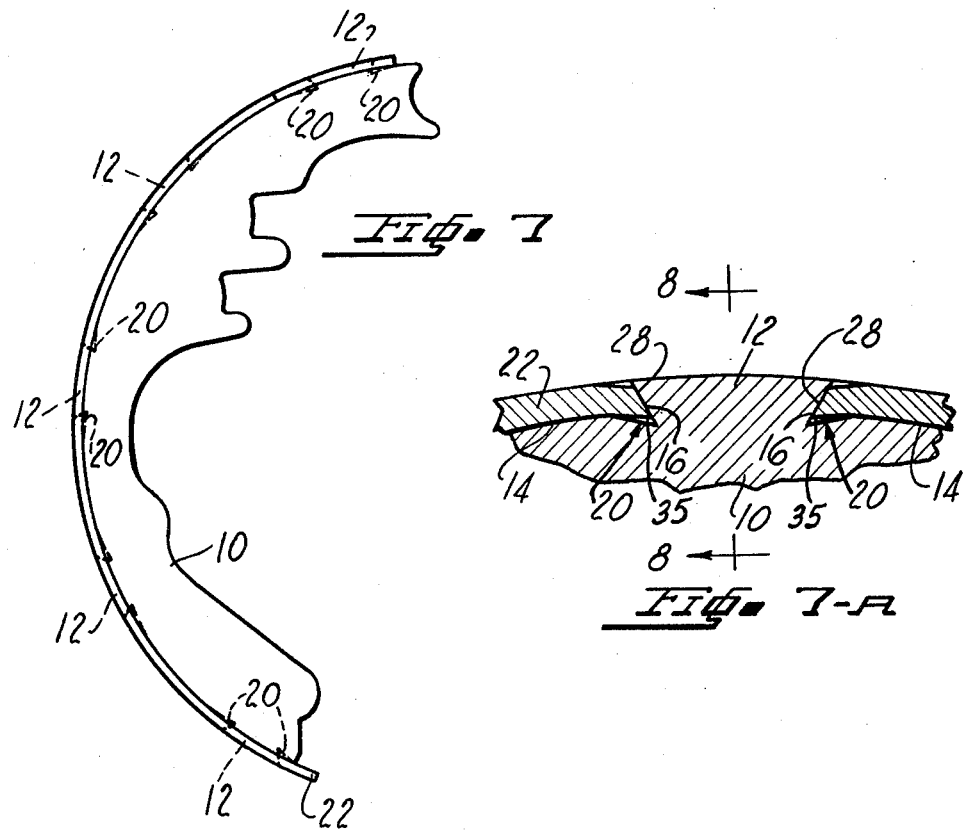
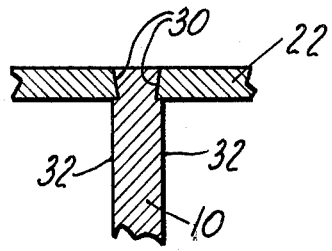
INVENTOR.
THOMAS H. LAVENGOOD
BY
*Sheldon F. Raizes*
ATTORNEY

United States Patent Office 3,265,166
Patented August 9, 1966

3,265,166
BRAKE SHOE
Thomas A. Lavengood, South Bend, Ind., assignor to The Bendix Corporation, South Bend, Ind., a corporation of Delaware
Filed Aug. 31, 1964, Ser. No. 393,145
2 Claims. (Cl. 188—250)

This invention relates to a brake shoe construction.

This invention concerns a brake shoe which can be fabricated from separate web and rim pieces without requiring a welding operation and which is an improvement upon the brake shoe illustrated and disclosed in U.S. Patent No. 2,964,142, issued to Goepfrich.

It has been found in producing the shoe illustrated in the Goepfrich patent that very close tolerances must be maintained between the circumferentially spaced end edges of each of the slots in the rim of the brake shoe and the circumferentially spaced end edges of each of the projections of the web of the brake shoe in order to maintain a tight fit between the end edges of each of the projections and slots to prevent relative circumferential movement between the web and rim. This of course incurs an added expense to the construction of the brake shoe and even with maintaining the tolerances within accepted limits, the brake shoes are not guaranteed against relative circumferential movement between the rim and web due to very limited contact between the end edges of the slots and projections.

It is an object of this invention to overcome this disadvantage by providing a generally dove-tailed connection between the end edges of the web projections and the end edges of their respective rim slots to ensure engagement between the end edges of the slots and projections which is sufficient to prevent relative circumference movement between the rim and the web of the brake shoe.

Figure 1:
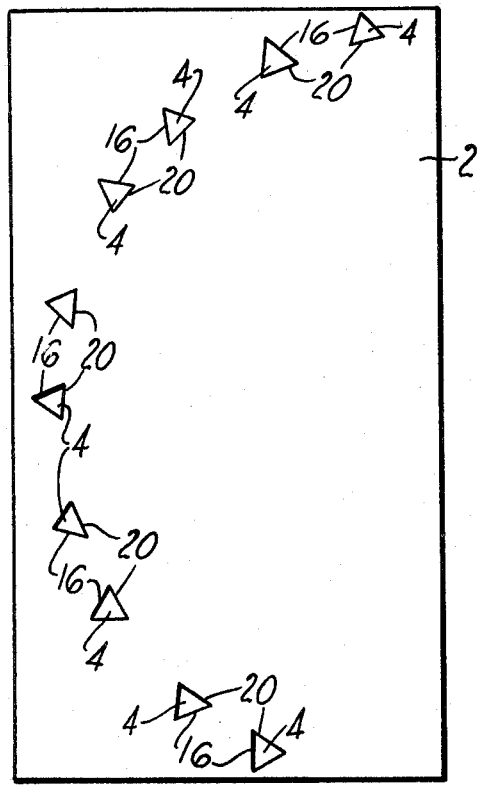
Figure 1A:
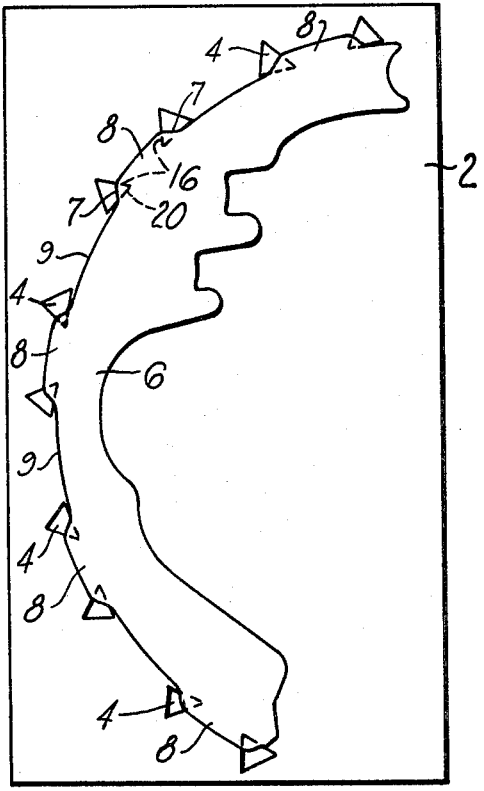
Figure 2:
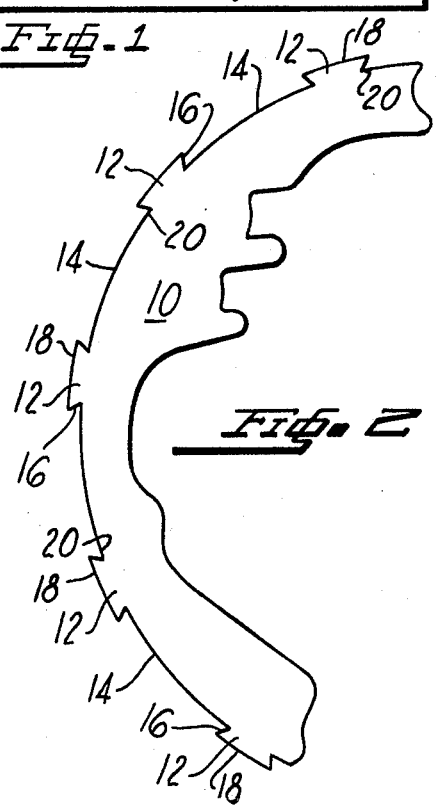
Figure 2A:
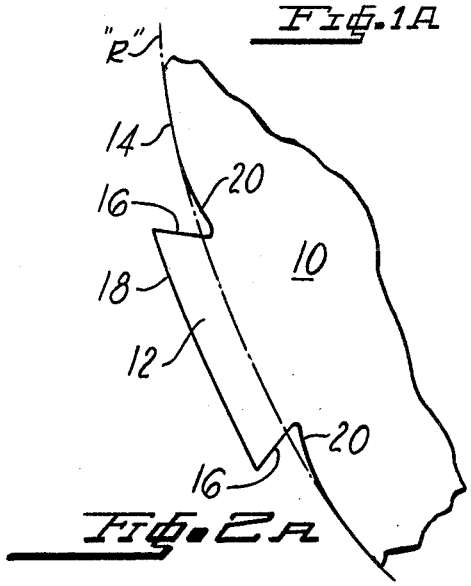
Figure 3:
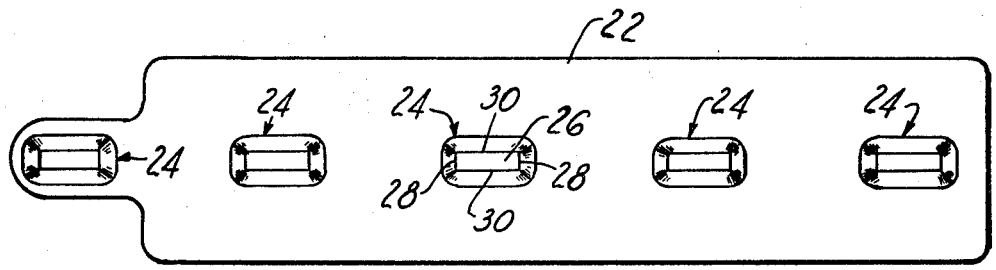
Figure 5:
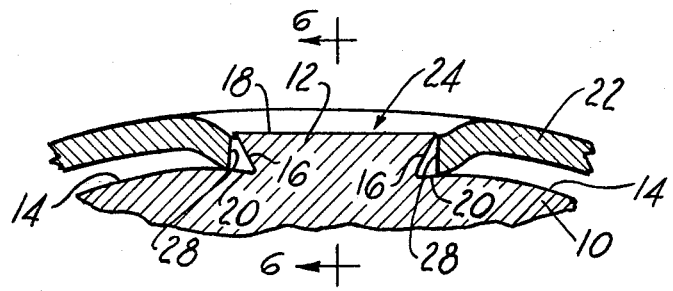
Figure 6:
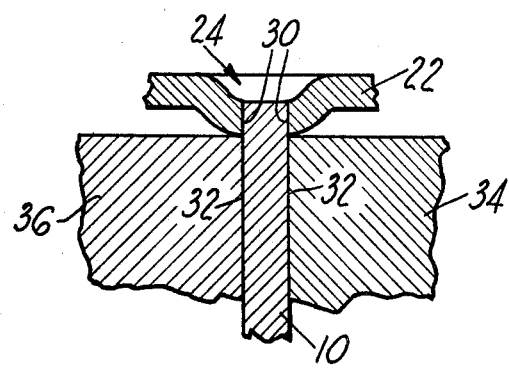

Other objects of the invention will become apparent to those skilled in the art from the following description with reference to the drawings wherein:

FIGURE 1 is a view of a punched sheet of metal;
FIGURE 1–A is a view of the sheet of metal being blanked;
FIGURE 2 is a view of the blanked web of FIGURE 1–A;
FIGURE 2–A is an enlarged view of a projection located on the brake shoe web of FIGURE 2;
FIGURE 3 is a view of the rim of the brake shoe;
FIGURE 4 is a view of the brake shoe being assembled by a roller assembly;
FIGURE 5 is a view of the relationship between the projection of the web and a slot in the rim prior to assembly;
FIGURE 6 is a cross sectional view along line 6—6 of FIGURE 5;
FIGURE 7 is a view of the web and rim assembled;
FIGURE 7–A is an enlarged cutaway view illustrating the relationship between the projection and the end edges of the slots of the rim; and
FIGURE 8 is a section view taken along line 8—8 of FIGURE 7–A.

Referring to FIGURES 1 and 1–A, a sheet of metal 2 is provided and then triangles 4 are punched into the sheet. The sheet is then fed into a blanking die which has a cutting head 6 of a shape of a brake shoe web 10 illustrated in FIGURE 2. However, the edges 7 of each projection 8 are curved into an arcuate outer edge 9 of the cutting head. The triangles are so spaced that when the sheet is fed into the die the edge 16 of the triangles will form the edges of the resulting projections 12 of the web 10 and the edge 20 of the triangle will intersect the resulting outer arcuate edge 14 of the web 10.

Referring to FIGURES 2 and 2–A, the blanked web 10 is provided with a plurality of projections 12 each having a pair of circumferentially spaced edges 16 which decline toward each other from the outer edge 18 of the projection, thereby forming a generally dove-tailed shaped projection. The arcuate outer edge 14 is of a given radius "R," except in the vicinity of the end edges 16 of the projections, where the portion 20 of the outer edge is cut below an imaginary continuation of the arc defining the edge 14. The portion 20 is located below the continuation of the arc to allow for misfeeding of the web to the die. If the portion 20 were designed to be coincident with the arc of the edge 14 and the web was misfed, the portion 20 could be above the arc resulting in a bump on the outer surface of the rim after assembly which could not be tolerated since the brake lining must cover the outer surface.

FIGURE 3 illustrates a rim 22 comprising a plurality of circumferential space depressed areas 24. A slot 26 is punched in each depressed area and has a pair of end edges 28 and a pair of side edges 30, each of which are offset from the plane of the body of the rim 22.

Referring to FIGURE 4, there is illustrated a lower roller comprising a pair of coaxial drums 34, 36 (only drum 34 is illustrated) and an upper roller drum 38 for assembling the web and the rim. The lower roller may be a continuously rotating device into which a web is inserted manually during part of each revolution (see Patent No. 2,041,461 for a detailed description of an operative arrangement) and is so constructed as to hold the web in the proper radial location. The web is tightly clamped between the two drums 34, 36 with the projections 12 extending beyond the periphery of the drums during the shoe-assembling part of the roller revolution and the drums open up during another phase of the revolution to permit the assembled shoe to drop out.

The flat rim 22 is fed between the lower roller and the upper roller 38 which provides the forming pressure. Preferably, an automatic feeding device is used to move the rims horizontally, one at a time, from a hopper in which they are stacked, into the position illustrated in FIGURE 4. The movements of the web and rim are automatically coordinated to bring the first web projection into the first rim slot, as shown in FIGURE 4. Due to the dove-tailed shape of the projection 12, the edge 16 "hooks" onto the edge 28 of the rim to drag the rim therewith between the lower and upper rollers whereby the depressed area 24 adjacent the edges 30 engages the drums 34 and 36.

As the pressure of the upper roller 38 comes to bear on the shoe rim, it forces the body of the rim against the lower roller forming it to an arcuate shape and bringing it into engagement with the arcuate outer edge 14 of the web while at the same time bringing the edges 30 of the depressed area 24 back into the plane of the rim body. As the edges 30 are forced back into the plane of the rim body, the edges 28 are drawn into the plane of the rim by the edges 30 and also are forced into the plane of the rim body by the outer edge 14 of the rim bearing at the junction of the edge 16 and the portion 20 on the edge 28. The relationship between the depressed edges 28, 30 of the slots and the projections 18 is illustrated in FIGURES 5 and 6. It can be seen that the edges 16 are at an angle to the edges 28 of the slots 12, and that the edges 30 are parallel to the side faces 32 of the projection 12. As the depressed portion 24 is re-aligned with the main body portion of the rim 22, the edges 30 will extend at an angle toward each other to effect a lateral compressive force on the faces 32 resulting in the edge 30 digging into the faces 32 to effect a dove-tailed connection therebetween, as illustrated in FIGURE 7–A, and the edges 28 of the depressed area 24 will compressively engage the edges 16 of the projections 12 to form a dove-tailed connection therebetween, as illustrated in FIGURE 8, which is in a plane generally perpendicular to the first mentioned dove-tailed connection. Depending upon the tolerance stack-up, the edges 28 will be entirely aligned with the rim body or substantially aligned, as shown in FIGURE 7–A, leaving a space 35 between the portion 20 of the edge 14 and the formerly depressed area adjacent the edges 28.

From the above, it can be readily seen that the rim and web are locked against relative movement without close tolerances being required in the manufacture thereof.

While the invention has been described in considerable detail, I do not wish to be limited to the particular construction shown and described; and it is my intention to cover hereby all modifications thereof which come within the scope of the following claims.

What I claim is:

1. A brake shoe comprising: a web having an arcuate outer edge, at least one projection extending from said outer edge, said projection having a pair of opposed faces and a pair of circumferentially spaced edges, said circumferentially spaced edges declining in a direction toward each other from the outer edge of said projection to provide a generally dove-tailed projection with the widest portion thereof being at the outer end thereof, an arcuate rim having at least one slot receiving said projection therethrough, the inner surface of said rim engaging the outer edge of said web, the edges of said slot being substantially aligned with the body of said rim, the end edges of said slot compressively engaging a respective one of said circumferentially spaced edges of said projection, the side edges of said slot compressively engaging their respective faces of said projection, whereby said web is locked to said rim to prevent movement of said rim relative to said web and to prevent circumferential movement of said rim relative to said web, and a space provided between the inner surface of said rim and the outer surface of said web adjacent said circumferentially spaced edges.

2. A brake shoe comprising: a web having an arcuate outer edge, at least one projection extending from said outer edge, said projection having a pair of opposed faces and a pair of circumferentially spaced edges, said circumferentially spaced edges declining in a direction toward each other from the outer edge of said projection to provide a generally dove-tailed projection with the widest portion thereof being at the outer end thereof, the faces of said projection declining toward each other from the outer edge thereof to provide a dove-tailed cross section of said projection with the thickest portion being at the outer end thereof, an arcuate rim having at least one slot receiving said projection therethrough, the inner surface of said rim engaging the outer edge of said web, the edges of said slot being substantially aligned with the body of said rim, the end edges of said slot compressively engaging a respective one of said circumferentially spaced edges of said projection, the side edges of said slot compressively engaging their respective faces of said projection whereby a dove-tailed connection is formed in two perpendicular planes to lock said web to said rim to prevent outward movement of said rim relative to said web and to prevent circumferential movement of said rim relative to said web, and a space provided between the inner surface of said rim and the outer surface of said web adjacent said circumferentially spaced edges.

References Cited by the Examiner

UNITED STATES PATENTS

| 1,826,283 | 10/1931 | Mooers | 188—250 |
| 1,862,124 | 6/1932 | Skelton. | |
| 2,964,142 | 12/1960 | Goepfrich | 188—250 |

MILTON BUCHLER, *Primary Examiner.*

G. E. A. HALVOSA, *Assistant Examiner.*